United States Patent [19]
Kulik et al.

[11] 3,712,348
[45] Jan. 23, 1973

[54] SAW BLADE FOR A FRAME SAW HAVING TEETH WITH REINFORCED EDGES

[75] Inventors: Leo Kulik; Gustav Gustenau, both of Wien 10, Austria

[73] Assignee: Firma Franz Lipowsky Sagen-u.Maschinen-messerfabrik, Wein, Austria

[22] Filed: Jan. 13, 1971

[21] Appl. No.: 106,014

[30] Foreign Application Priority Data

Jan. 14, 1970 Austria..................A 346/70

[52] U.S. Cl...................83/835, 30/388
[51] Int. Cl. ..............................B27b 33/04
[58] Field of Search...143/133 A, 133 B, 133 R, 140, 143/141, 142, 143, 133; 29/95 B, 95

[56] References Cited

UNITED STATES PATENTS

| 1,690,803 | 11/1928 | Vanderwee | 143/133 A |
| 3,048,207 | 8/1962 | Ferrari | 143/133 B |
| 431,510 | 7/1890 | Douglas | 143/140 |

Primary Examiner—Donald R. Schran
Attorney—Karl F. Ross

[57] ABSTRACT

A saw blade for a frame or gang saw has teeth each formed with a reinforced edge region. This region has a planar upper surface inclined rearwardly and inwardly away from a cutting direction and a pair of planar flank surfaces converging backwardly in the cutting direction and each defining a locus of lines perpendicular to the cutting direction whereby the lateral flanks include angles of at least 90° with the upper surface and preferably are perpendicular thereto.

5 Claims, 4 Drawing Figures

PATENTED JAN 23 1973 3,712,348
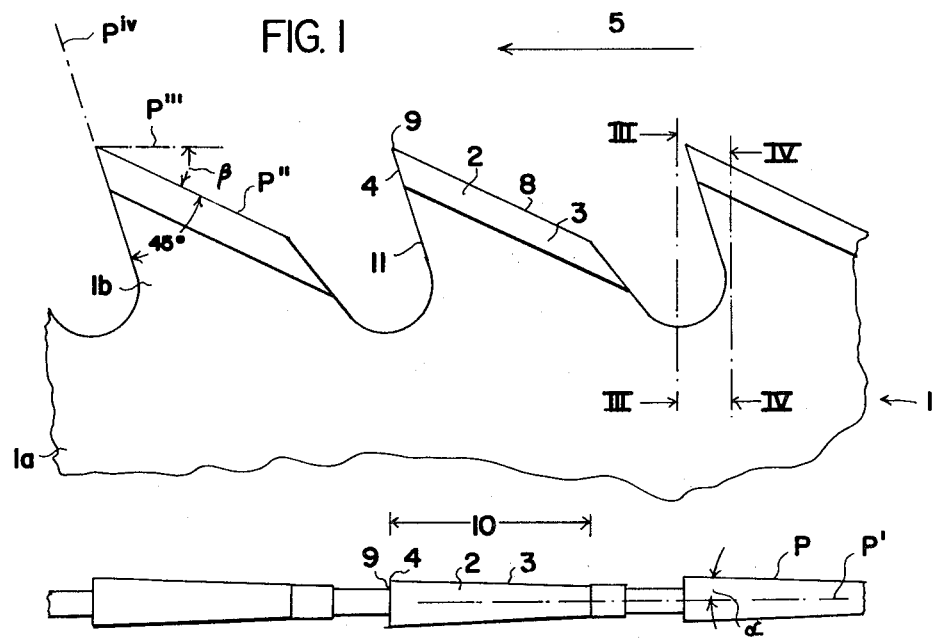
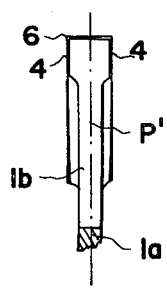
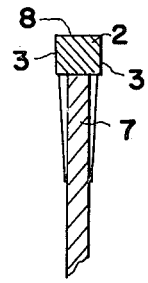
Leo Kulik
Gustav Gustenau
INVENTOR.
BY Karl F. Ross
Attorney

SAW BLADE FOR A FRAME SAW HAVING TEETH WITH REINFORCED EDGES

FIELD OF THE INVENTION

The present invention relates to a saw blade usable in a frame saw. More specifically this invention concerns a blade of this type having teeth formed with thickened edge regions.

BACKGROUND OF THE INVENTION

It has been found advantageous to thicken the upper edges of the teeth of frame-saw blades, that is to make the teeth thicker along the outside, wood-contacting edge than inwardly therefrom. This is generally done by stamping which imparts a thickened edge region having flank surfaces which are continuous with and diverge outwardly from the side faces of the blade, and hence include angles with the trailing surface or top of the tooth which are less than 90°. Such a thickened edge imparts great strength to the tooth and allows it to be reground many times for a long blade-service life. Springlike deformation of the tooth back in the direction of cutting is almost completely eliminated by the reinforced edge.

With a blade so formed the leading edge of the top surface of the tooth is also the cutting edge, and since the two flanks of the thickened edge taper inwardly away from this cutting edge, the corners of the leading edge alone serve to guide the saw in the kerf or cut. For this reason the kerf formed by such a blade is often irregular, the guiding means being limited to two points of contact with the kerf.

OBJECTS OF THE INVENTION

It is an object of the present invention to provide an improved saw blade of the above-mentioned type, i.e. for frame or gang saws.

Another object is to provide such a blade which overcomes the above-given disadvantages.

Yet another object is to provide a tooth structure for a saw blade which has long service life, guides itself in the kerf, and which can be reground many times before being discarded.

SUMMARY OF THE INVENTION

The above objects are obtained by a saw blade having a plurality of teeth in the plane of the blade body each formed with a thickened edge region (i.e. a prismatic formation projecting laterally of the thinner planar blade body and joining the latter preferably at right-angle shoulders) which has an upper surface inclined outwardly away from the blade body in a forward cutting direction and a pair of flank surfaces converging rearwardly and inwardly toward the blade body and each defining a locus of parallel lines substantially perpendicular to the forward-cutting direction. In other words, the lateral flanks of the tooth are offset outwardly from the blade body symmetrically on opposite sides of a median plane through the blade and include angles of at least 90° with the aforementioned upper surface.

In accordance with a feature of this invention, the two flank surfaces and the upper surface are all planar with the convergent planes of the flanks lying at right angles to the plane of the upper surface.

The thickened edge region therefore presents three cutting edges instead of the customary one, since the leading edges of the two flanks in such a blade also serve to cut. This alone greatly reduces wear of the blade. At the same time these lateral cutting edges formed by the leading (relative to the forward cutting direction) edges of the flank surfaces serve to guide the blade in the kerf with line contact with the sides of the kerf, thereby eliminating vibration and irregular cutting, and mill the sides of the cut to leave the cut surface relatively smooth.

DESCRIPTION OF THE DRAWING

The above and other objects, features, and advantages will become apparent from the following description, reference being made to the accompanying drawing, in which:

FIG. 1 is a side view of a portion of a blade according to the present invention;

FIG. 2 is a top view of the blade portion shown in FIG. 1; and

FIGS. 3 and 4 are sectional views corresponding to cuts taken along lines III — III and IV — IV, respectively, of FIG. 1, FIG. 4 illustrating another embodiment of the invention.

SPECIFIC DESCRIPTION

As shown in FIGS. 1 – 5, a gang- or frame-saw blade 1 is provided with a plurality of teeth 7 adapted to cut in the direction indicated by arrow 5 (forward direction). Each tooth 7 is formed on the blade body 1a with a thin web 1b of the thickness of the blade body and is provided with an upper reinforced edge region 2 having an upper surface 8 inclined down rearwardly in the direction 5 and a pair of flank surfaces 3 converging rearwardly in that direction.

Each side or flank surface 3 lies in a plane P which defines a locus of lines parallel to the plane P' of symmetry of the blade 1, the latter plane lying parallel to the direction of cut 5. The blade 1 thus has a plane P' in line with the cut direction 5. In this example the planes P and P' include angles $\alpha$ of 2° to 20°, preferably about 10° with one another and the planes P are arranged symmetrically to each side of the plane P'.

The upper surface 8 is planar and defines a surface P'' which is inclined at an angle $\beta$ of 15° to 45°, preferably about 25° to a plane P''' of the crests of the teeth parallel to the direction 5 and perpendicular to plane P' and forms, with the tooth leading face 11, a cutting edge 9. The face 11 lies in a plane P'''' at an angle of 50° to 80°, preferably about 70° to the direction 5 and plane P''' so that the angle of cutting edge 9 is between 35° and 55°, preferably about 45°.

The thickened region 2 is generally prismatic and can be of rectangular cross-section or even of trapezoided section with the narrow base forming the surface 8, and extends along substantially all the upper region 10 of the tooth 7, allowing this tooth to be ground back practically its whole length for reuse. In this case the length of the region 2 is originally equal to about two-thirds of the distance on the blade from point 9 to point 9.

The region 2 is advantageously formed by hard or cold stamping and machined and then hardened (case-hardened) on its surfaces 3 and 8, along its full length 10 so that as it is reground it retains the requisite cutting hardness. A hard-chrome coating 6 is shown in FIG. 3 covering the top and sides of the region 2.

FIG. 4 shows, however, how the region 2 can be constituted by a hard material which is brazed onto or set into the blade 1. Ideally, an elongated substantially parallelopipedal chip of carbide or a similar highly wear-resistant material is used, giving the blade excellent wear resistance and long-lasting sharpness. The chip or body of carbide is of square cross section and unitarily bonded to the tooth 7.

It is worth noting that, due to the inclination at 25° of the edge 2 and the length of this edge, the rear end lies inwardly of the leading edge. In this manner, the whole side surface 8 on each side serves to sweep the cut, making sawdust elimination rapid.

FIG. 3 also shows that the leading edges 4 of the side surfaces 8 are almost completely parallel to the plane P', for best guiding of the blade 1 in the kerf.

We claim:

1. A saw blade for a frame saw comprising a planar blade body provided with a multiplicity of spaced apart teeth forwardly overhanging teeth-spacing recesses in the direction of cutting movement of the blade, and respective elongated reinforcement portions extending all along the crests of each of said teeth of a thickness in excess of the thickness of said body and disposed symmetrically with respect to the faces thereof, each of said reinforcement portions comprising:

a front planar flank inclined rearwardly away from an apex of the reinforcement portion and at an acute angle to a plane perpendicular to said body and said direction of cutting movement;

a planar top flank defining an acute angle with said front flank at said apex and inclined rearwardly at an acute angle away from a plane parallel to said cutting direction but perpendicular to said body; and a pair of longitudinally extending planar lateral flanks of uniform width over the entire length of the reinforcement portion and defining sharp edges at angles of 90° with said top flank, said lateral flanks converging toward one another symmetrically rearwardly and each having a limiting edge spaced from the edge defined with said top flank and parallel thereto.

2. The blade defined in claim 1 wherein said flanks are hardened.

3. The blade defined in claim 1 wherein said flanks are coated with a highly wear-resistant material.

4. The blade defined in claim 1 wherein said reinforcement portion is formed by a body of highly wear-resistant material unitarily bonded to said tooth.

5. The blade defined in claim 4 wherein said body is substantially square in cross section.

* * * * *